United States Patent [19]
Nakagoshi

[11] Patent Number: 5,559,838
[45] Date of Patent: Sep. 24, 1996

[54] DIVERSITY RECEIVING APPARATUS

[75] Inventor: Arata Nakagoshi, Kokubunji, Japan

[73] Assignee: Hitachi, Ltd., Tokyo, Japan

[21] Appl. No.: 558,483

[22] Filed: Nov. 16, 1995

Related U.S. Application Data

[62] Division of Ser. No. 350,023, Nov. 29, 1994.

[30] Foreign Application Priority Data

Dec. 1, 1993 [JP] Japan ................... 5-301441
Dec. 7, 1993 [JP] Japan ................... 5-306246

[51] Int. Cl.$^6$ ............................... H04B 7/12; H04B 7/26
[52] U.S. Cl. ............... 375/347; 455/133; 455/277.1; 370/95.3
[58] Field of Search ............................ 375/267, 347; 455/133–136, 277.1, 277.2; 370/95.1, 95.3

[56] References Cited

U.S. PATENT DOCUMENTS

| | | | |
|---|---|---|---|
| 4,710,944 | 12/1987 | Nossen | 375/347 |
| 4,756,023 | 7/1988 | Kojima | 455/134 |
| 5,203,023 | 4/1993 | Saito et al. | 375/347 |
| 5,203,027 | 4/1993 | Nounin et al. | 375/347 |
| 5,291,519 | 3/1994 | Tsurumaru | 375/347 |
| 5,345,601 | 9/1994 | Takagi et al. | 455/134 |
| 5,388,100 | 2/1995 | Ohtsuka | 375/347 |
| 5,390,166 | 2/1995 | Rohani et al. | 370/95.3 X |
| 5,390,342 | 2/1995 | Takayama et al. | 455/134 |
| 5,490,180 | 2/1996 | Muto | 375/347 |

FOREIGN PATENT DOCUMENTS

| | | | |
|---|---|---|---|
| 60-233945 | 11/1985 | Japan | 455/277.2 |
| 2-271724 | 11/1990 | Japan | |
| 4-130829 | 5/1992 | Japan | 455/277.2 |

OTHER PUBLICATIONS

*Journal of the Institute of Electronics, Information and Communication Engineers of Japan*, vol. 73, No. 8, Aug. 1990, pp. 812–818 (in Japanese).

*Primary Examiner*—Young T. Tse
*Attorney, Agent, or Firm*—Antonelli, Terry, Stout & Kraus

[57] ABSTRACT

A diversity receiving apparatus includes a plurality of receivers, each of which receives a plurality of signals and includes a detector which selects and outputs a desired signal from the received signals, and a delay circuit which delays the desired signal to produce a delayed signal. A level comparator compares signal levels of the desired signals outputted from the detectors with one another, and produces an output indicating which one of the desired signals has a highest signal level. A selector responsive to the output of the level comparator selects and outputs the delayed signal produced by the delay circuit delaying the desired signal having the highest signal level. A demodulator demodulates the selected delayed signal. A power controller supplies power to the level comparator and all of the receivers at a preset level comparison period, continues to supply power to the receiver including the detector outputting the desired signal having the highest signal level after the level comparator has finished comparing the signal levels of the desired signals with one another until a next level comparison period, and stops supplying power to the level comparator and all of the receivers except the receiver including the detector outputting the desired signal having the highest signal level after the level comparator has finished comparing the signal levels of the desired signals with one another until the next level comparison period.

20 Claims, 16 Drawing Sheets

DIVERSITY RECEIVING APPARATUS

This is a division of application Ser. No. 08/350,023 filed on Nov. 29, 1994, pending.

BACKGROUND OF THE INVENTION

1. Field of the Invention

The present invention relates to a diversity receiving apparatus and, more particularly, to a diversity receiving apparatus which can realize a low electric power consumption.

2. Description of the Related Art

In a conventional diversity receiving apparatus, electric powder is supplied to a plurality of receivers, thereby making them operative.

The diversity receiving apparatus is a receiving apparatus for extracting a detected output or demodulated output of a receiver exhibiting a good receiving state from signals received by a plurality of receivers, such that the outputs of all but one of the plurality of receivers are unnecessary. A conventional example of a diversity receiving apparatus using two receivers will now be described. FIG. 13 shows a construction of a diversity receiving apparatus comprising a receiver 1A and a receiver 1B. After received desired signals are obtained by detectors 2A and 2B, they are demodulated by demodulators 3A and 3B. A level comparator 4 compares the received signal levels of the received desired signals obtained by the detectors 2A and 2B. From the comparison result, the demodulated signal having a higher received signal level selected by a selector 5 and is output as a final demodulated output. FIG. 14 shows a relation between the received signal level in the two receivers 1A and 1B. The abscissa denotes time and the ordinate indicates a received signal level of the received desired signal after completion of the detection. The received signal level ordinarily changes with the elapse of time due to fading or the like. For example, when antennas of two receivers are mounted at positions having a small correlation therebetween and signals are received, the received signal levels tend to vary over time as shown in, for instance, FIG. 14. In the diversity receiving apparatus shown in FIG. 13, a received signal level of the receiver 1A and a received signal level of the receiver 1B are always compared by the level comparator 4. The demodulated signal having the higher received signal level is selected by the selector 5. Therefore, the demodulated signal of the receiver 1A is selected in time areas 1 and 3 in FIG. 14, while the demodulated signal of the receiver 1B is selected in time area 2. The demodulated signal having the higher received signal level, consequently, can be always obtained. In the conventional diversity receiving apparatus shown in 13, however, since the two receivers are always in the operating state, the total electric power consumption of the two receivers is twice as large as the electric power consumption in the case of using one receiver.

As a method of reducing the electric power consumption by suppressing a deterioration in receiving characteristics of the diversity receiving apparatus, for example, the conventional method disclosed in Japanese Patent Application No. 1-94025 published as Japanese Kokai 2-271724 can be mentioned. The method of reducing the electric power consumption in such a conventional example will now be described with reference to FIG. 15. According to the conventional method shown in FIG. 15, two thresholds (threshold 1>threshold 2) are provided for the received signal levels of the receivers 1A and 1B. When either one of the received signal levels of the receivers 1A and 1B is equal to or larger than the threshold 1 and the other one is equal to or less than the threshold 2, only the receiver whose received signal level is equal to or larger than the threshold 1 is made operative. That is, in the area 1 in FIG. 15, since the received signal level of the receiver 1A exceeds the threshold 1 and the received signal level of the receiver 1B is equal to or less than the threshold 2, only the receiver 1A is made operative and the power supply to the receiver 1B is stopped. In the area 2, since both of the received signal levels of the receivers 1A and 1B are equal to or less than the threshold 1, both of the two receivers 1A and 1B are made operative and the received signal levels of the received desired signals obtained by the detectors 2A and 2B are compared by the level comparator 4. The demodulated signal having the higher received signal level is selected by the selector 5. In the area 3, on the other hand, since the received signal level of the receiver 1B exceeds the threshold 1 and the received signal level of the receiver 1A is equal to or less than the threshold 2, only the receiver 1B is made operative and the power supply to the receiver 1A is stopped. In the area 4, since both of the received signal levels of the receivers 1A and 1B are equal to or less than the threshold 1, both of the two receivers 1A and 1B are made operative. In the area 5, only the receiver 1A is made operative in a manner similar to the case of the area 1. Thus, only either one of the receivers 1A and 1B operates in the areas 1, 3, or 5, so that there is an effect of reduction of the electric power consumption for a period of time corresponding to such areas. In the conventional method shown in FIG. 15, however, since the two receivers always operate in the areas 2 and 4, for example, in the case where a frequency at which the received signal levels are relatively low and the received signal levels of the two receivers exceed the threshold 1 is low, or in the case where a frequency at which the receiving states are relatively good and the received signal levels are lower than the threshold 2 is low, a frequency at which the two receivers operate simultaneously increases, so that the effect of the reduction of the electric power consumption decreases.

A conventional example of a diversity receiving apparatus which is used in a digital communication system using a time division multiple access system (TDMA system) will now be described.

In the digital communication system using the time division multiple access system, information is intermittently communicated at a preset time period. As shown in FIG. 16, namely, a time base is divided into frames, thereby constructing a time division received signal 10. Each frame is divided into three slots 1, 2, and 3 which are assigned to respective users and time compression is performed for every slot. For example, when the slot 2 is assigned, the reception is performed for only the period of time of the slot 2 and the reception is stopped for the other periods of time (slots 1 and 3). The time compressed received signal is demodulated and, after that, it is expanded in time, so that an expanded received signal 11 is derived.

In the diversity receiving apparatus in the digital communication system using the TDMA system mentioned above, for instance, when the conventional method shown in FIG. 14 is applied, the two receivers 1A and 1B are made operative for the entire periods of time of all of the slots 2. Even in case of applying the conventional method shown in FIG. 15, the two receivers 1A and 1B have to be made operative for the entire periods of time of all of the slots 2 in the areas 2 and 4.

Generally, in addition to a level difference, a phase difference occurs between the detected signals or demodulated signals obtained by a plurality of receivers. Since there is a phase difference in the digital receiving system, even if a plurality of detected signals are simply switched and coupled to a demodulator with respect to time, there is a possibility that the data cannot be demodulated. Therefore, a method whereby a plurality of recovers up to the demodulators are provided and are continuously operated and one of a plurality of demodulated signals is switched by a selector, or a method whereby the plurality of demodulated signals are not switched for the slot periods of time but are switched on a slot unit basis, is used. An example of the latter method is shown in a timing chart of FIG. 16. The received signal levels are compared in the one frame, and the receiver to be selected in the next frame is decided based on the comparison. In this case, it is necessary to make two receivers operative in the previous frame to enable selection of a receiver in the present frame. Since the receiver in the present frame is selected based on the comparison in the previous frame, there is a problem such that in the case where a fluctuation in received signal level is shorter than the frame interval with respect to time, the correct receiver cannot be selected.

As a method of solving such a problem, as shown in FIG. 17, there is a method whereby a part of the signals of the slot 1 just before the slot 2 to be received is received by two receivers and their received signal levels are compared and only one of the receivers is made operative in accordance with the result of the level comparison of the slot 1 just before the slot 2 (Journal of the Institute of Electronics Information and Communication Engineers of Japan, Vol. 73, No. 8, August 1990, pp. 812–818. According to such a method, since the levels are compared in a state near the received signal levels of the slot to be received, the proper receiver can be selected so long as a communication system in which the slot 1 just before the slot 2 to be received certainly exists. However, in a system in which the slot 1 just before the slot 2 to be received is not always used, there is a problem that the proper receiver cannot be selected.

SUMMARY OF THE INVENTION

It is an object of the invention to provide a diversity receiving apparatus which can reduce the simultaneous operating time of a plurality of receivers and can realize a low electric power consumption while assuring an effect of a diversity reception.

A diversity receiving apparatus of the invention fundamentally makes only one of a plurality of receivers operative.

According to the invention, a plurality of receivers are made operative every preset time period and the received signal levels are compared. One of the receivers is selected in accordance with the comparison result. The power supply to the receivers other than the selected receiver and to the level comparator is stopped until the next level comparison. Therefore, the ratio between the time necessary for comparing the received signal levels and the set time period corresponds to the ratio at which the plurality of receivers simultaneously operate. By reducing such a ratio, the effect of reduction of the electric power consumption can be raised.

A periodicity appears as shown in FIG. 14 in the time fluctuation of the received signal level due to the fading or like. Now, assuming that the preset time period is sufficiently shorter than the fading period and the comparison of the received signal levels and the selection of the proper receiver are executed, it is possible to trace the fluctuation of the received signal level and the effect of the diversity reception can be assured.

In the diversity receiving apparatus, the signals are also received during the level comparison. Therefore, although no problem occurs in the case where the time required for comparison of the received signal levels is shorter than the time for the signal processing in the demodulator, a drop-out of the initial data occurs in the case where, on the contrary, it takes a long time for the level comparison and such a time is longer than the time for the signal processing in the demodulator. To prevent such a problem, by providing a delay circuit for each receiver and by correcting the delay time, the drop-out of the demodulated signal during the level comparison can be prevented. Even in the case where differences between the delay times until the reception in a plurality of receivers causes a problem, by correcting the delay time of the delay circuit provided for each receiver, such a problem can be solved. By providing the delay circuit for each receiver and by correcting the delay time, the number of demodulators provided for the respective receivers can be reduced to one and a single demodulator can be arranged at the out put of the selector. A scale of the diversity receiving apparatus can be reduced and there is no need to supply electric power to a plurality of demodulators, so that the effect of the reduction of the electric power consumption can be also enhanced.

Further, means for storing a time fluctuation of the received signal level and for dynamically controlling the time period in accordance with the time fluctuation is also added.

There is also considered a situation such that the periodicity of the aging time fluctuation of the received signal level changes in accordance with a state such as ambient circumstances or the like in which the diversity receiving apparatus is installed. The apparatus provides a countermeasure for such a situation by storing the time fluctuation of the received signal level and by dynamically controlling a comparison period of the received signal levels in accordance with the time fluctuations. For example, in the case where the received signal level fluctuates over a short period, the comparison period of the received signal levels is reduced, thereby assuring the effect of the diversity reception. When the fluctuation period is long, by increasing the comparison period of the received signal levels, the effect of the reduction of the electric power consumption can be raised.

The diversity receiving apparatus which is used in the digital communication system using the time division multiple access system will now be described.

In the diversity receiving apparatus which is used in the digital communication system using the time division multiple access system, the time periods for the reception and stopping of reception are preset as mentioned above. The comparison period of the received signal levels is decided in correspondence to the period of the time division reception. A plurality of receivers are made operative in a part of the slot to be received and the received signal levels are compared. One of the receivers is selected in accordance with the comparison parison result of the received signal levels. The power supply to the receivers other than the selected receiver and to the level comparator are stopped until the next received signal level comparison. Preferably, the part of the slot to be received in which the level comparison is performed is the head portion of the slot to be received.

Since the received signal level comparison is executed in the slot to be received, the diversity reception can be performed at a precision higher than that of the conventional apparatus.

Further, the comparison of the received signal levels in the level comparator does not necessarily need to be performed for all of the slots to be received. In order to raise the effect of the reduction of the electric power consumption, a data processor to analyze the time fluctuation of the received signal levels is provided between the level comparator and a power controller. Means for dynamically controlling the comparison period of the received signal levels on a slot unit basis in accordance with the time fluctuation on the basis of the result of the analysis of the data processor is added to the power controller.

In accordance with the situation such as ambient circumstances or the like in which the diversity receiving apparatus is installed, the periodicity of the time fluctuation of the received signal level changes. The time fluctuation of the received signal level is stored and the comparison period of the received signal levels is dynamically controlled on a slot unit basis in accordance with the time fluctuation. For example, in the case where the received signal level fluctuates over a short period, the comparison period of the received signal levels is set to the period of the time division reception, namely, to a frame period of the time division multiple access system, thereby assuring the effect of the diversity reception. In the case where the fluctuation period is long, the comparison period of the received signal level is set to a long period that is (n) times (n=2, 3, ... ) as long as the time division reception period, (n) times, as long as a frame period of the time division multiple access system, so that the effect of the reduction of the electric power consumption can be raised.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
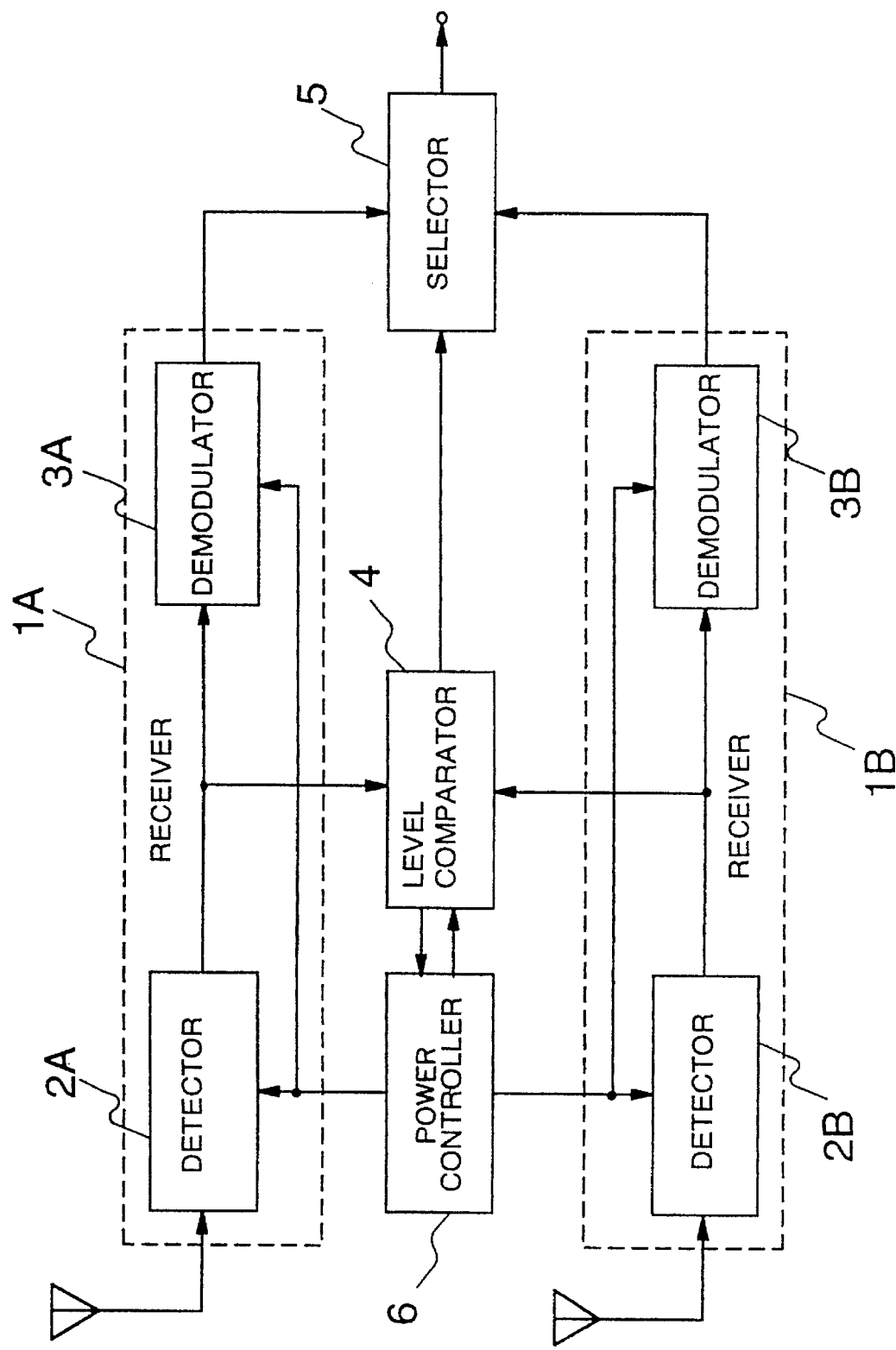
FIG. 1 is a functional block diagram showing the first embodiment of a diversity receiving apparatus according to the present invention.

FIG. 1 is a functional block diagram showing the first embodiment of a diversity receiving apparatus according to the invention. The receivers 1A and 1B comprise the detectors 2A and 2B and the demodulators 3A and 3B, respectively. The detectors 2A and 2B select the desired signals from the received signals. The demodulators 3A and 3B reproduce the selected signals. The level comparator 4 compares the received signal levels of the received desired signals which are outputted from the detectors 2A and 2B at timings which will be explained later, and supplies the comparison results to the selector 5 and a power controller 6. On the basis of the comparison result of the level comparator 4, the selector 5 selects the demodulated signal from the demodulator of the receiver having a higher received signal level and outputs the selected demodulated signal. The power controller 6 supplies electric to both of the receivers 1A and 1B at the time of the level comparison. After completion of the level comparison in the level comparator 4, the power controller 6 continues the power supply to only the receiver having the higher received signal level which is to continue the reception in accordance with the comparison result and stops the power supply to the other receiver.

Figure 2:
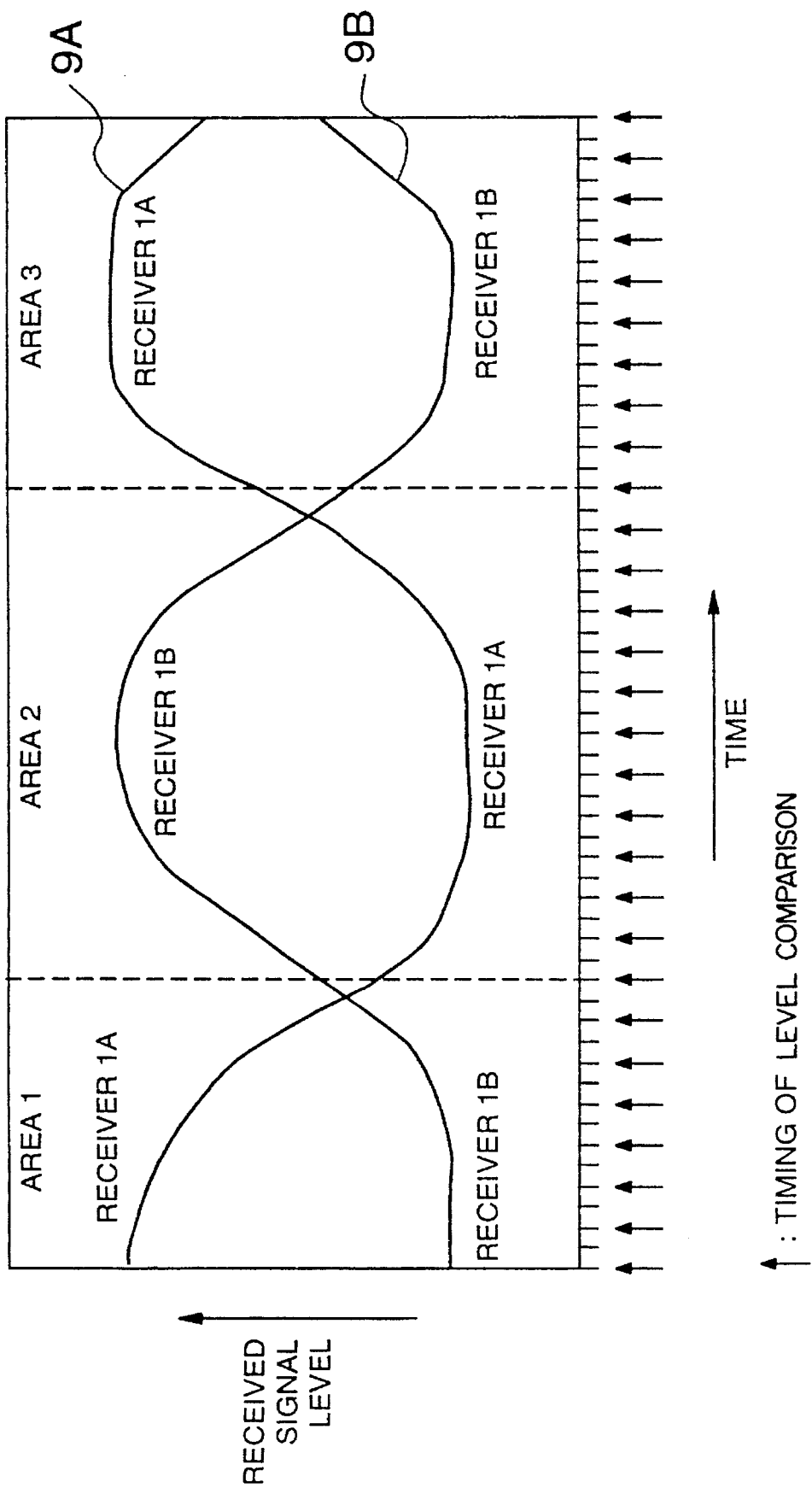
FIG. 2 is an explanatory diagram showing changes in received signal levels and the result of the diversity reception and selection according to the first embodiment of the invention.

FIG. 2 shows an example of the timing for the level comparison. In the first embodiment, the level comparison is executed at timings which are shown by arrows in FIG. 2 and correspond to a period that is sufficiently shorter than a fluctuation period of the received signal level shown in FIG. 2. When the level comparison is executed at each timing, the receiver 1A is selected in the areas 1 and 3, while the receiver 1B is selected in the area 2. When the time which is required for the level comparison, namely, the time during which both of the receivers 1A and 1B are in the receiving state is set to a sufficiently short time, the resulting operation is substantially the same as if only the receiver having the higher received signal level is operated. Thus, the reception can be substantially executed with an electric power consumption which is almost equal to that in the case where the diversity function is not provided.

After completion of the level comparison in the level comparator 4, by also stopping the power supply to the level comparator 4, the effect of the reduction of the electric power consumption is further improved.

The time fluctuation of the actual received signal level successively changes. For example, in the example shown in FIG. 2, the level fluctuation is relatively steep in the time area in which the received signal levels of the receivers A and B are reversed. After completion of the last level selection in the areas 1 and 2, the reversal of the received signal levels of the receivers 1A and 1B occurs. To compensate for such a reversal, it is necessary to increase the frequency of the level comparison (to reduce the time period at which the level comparison occurs). With respect to such a point, the time period is set in consideration of a trade-off between the effect of the reduction of the electric power consumption and the receiving performance.

Figure 3:
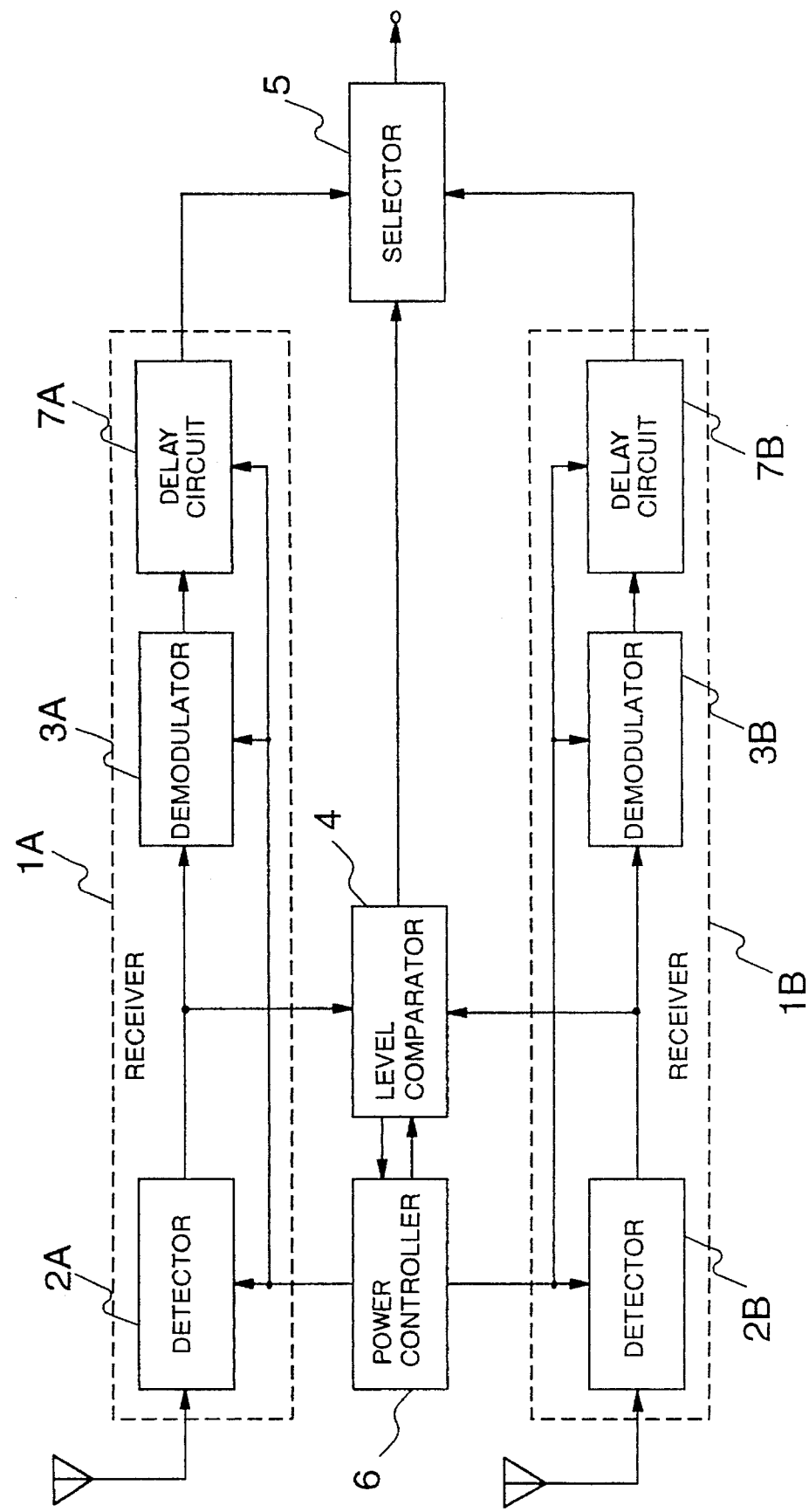
FIG. 3 is a functional block diagram showing the second embodiment of a diversity receiving apparatus according to the invention.
Figure 4:
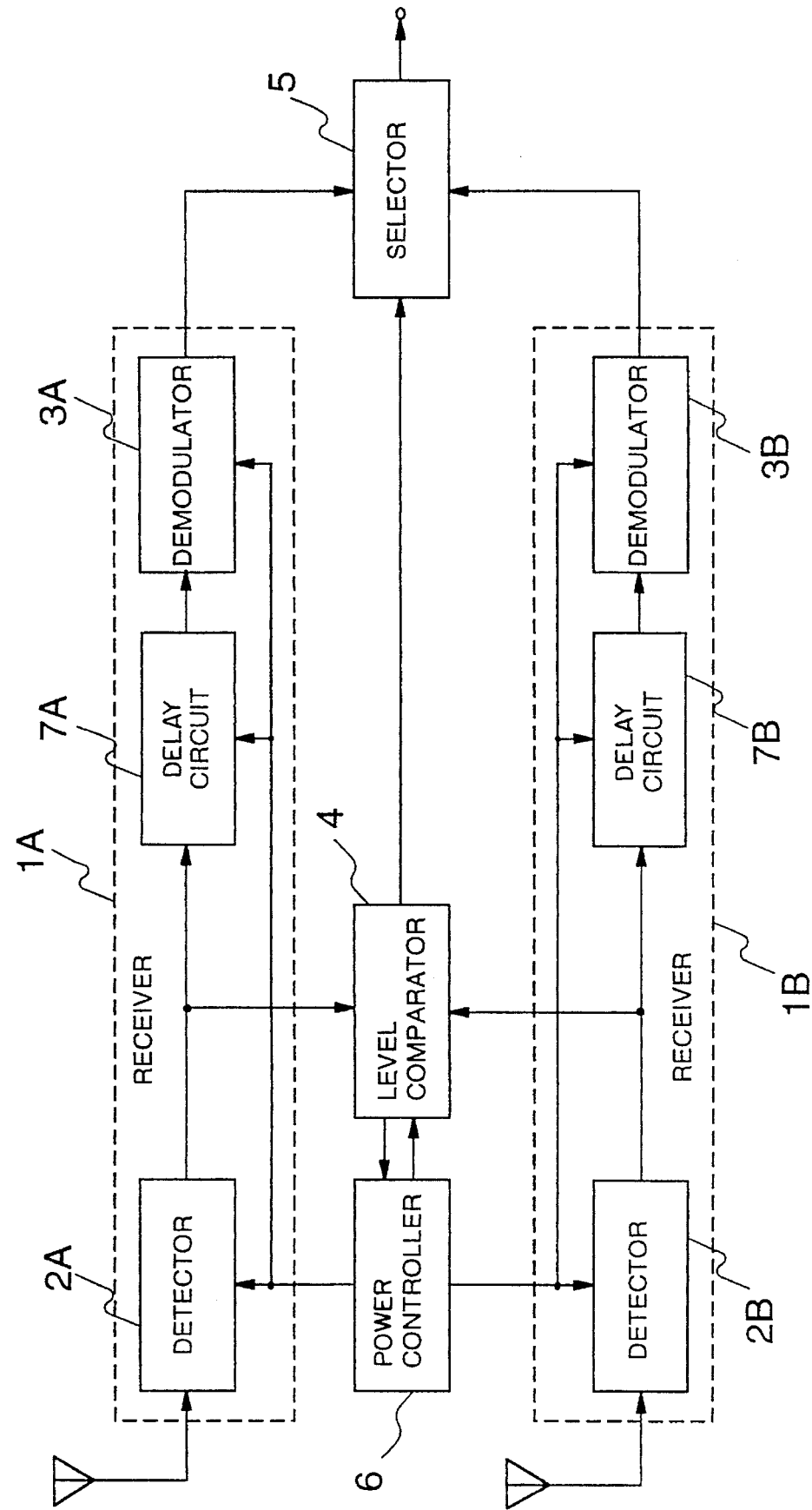
FIG. 4 is a functional block diagram showing the third embodiment of a diversity receiving apparatus according to the invention.

FIGS. 3 and 4 are functional block diagrams showing the second and third embodiments of a diversity receiving apparatus according to the invention. According to the second embodiment, a delay circuit 7A is provided between the demodulator 3A of the receiver 1A and the selector 5 in the first embodiment shown in FIG. 1, and a delay circuit 7B is provided between the demodulator 3B of the receiver 2A and the selector. According to the third embodiment, the delay circuit 7A is provided between the detector 2A of the receiver 1A and the demodulator 3A of the receiver 1A in the first embodiment shown in FIG. 1, and the delay circuit 7B is provided between the detector 2B of the receiver 1B and the demodulator 3B of the receiver 1B. The setting of the timing for comparison of the received signal levels, the selection of the demodulated signal by the selector 5, and the control of the power supply to the receivers 1A and 1B and the level comparator 4 are executed in a manner similar to the first embodiment. According to the second and third embodiments, each of the delay circuits 7A and 7B has a delay time according to the time which is required for the level comparison in the level comparator 4 and delays the input of the demodulated signal to the selector 5 during the level comparison, thereby enabling the drop-out of the data during the level comparison to be prevented.

Figure 5:
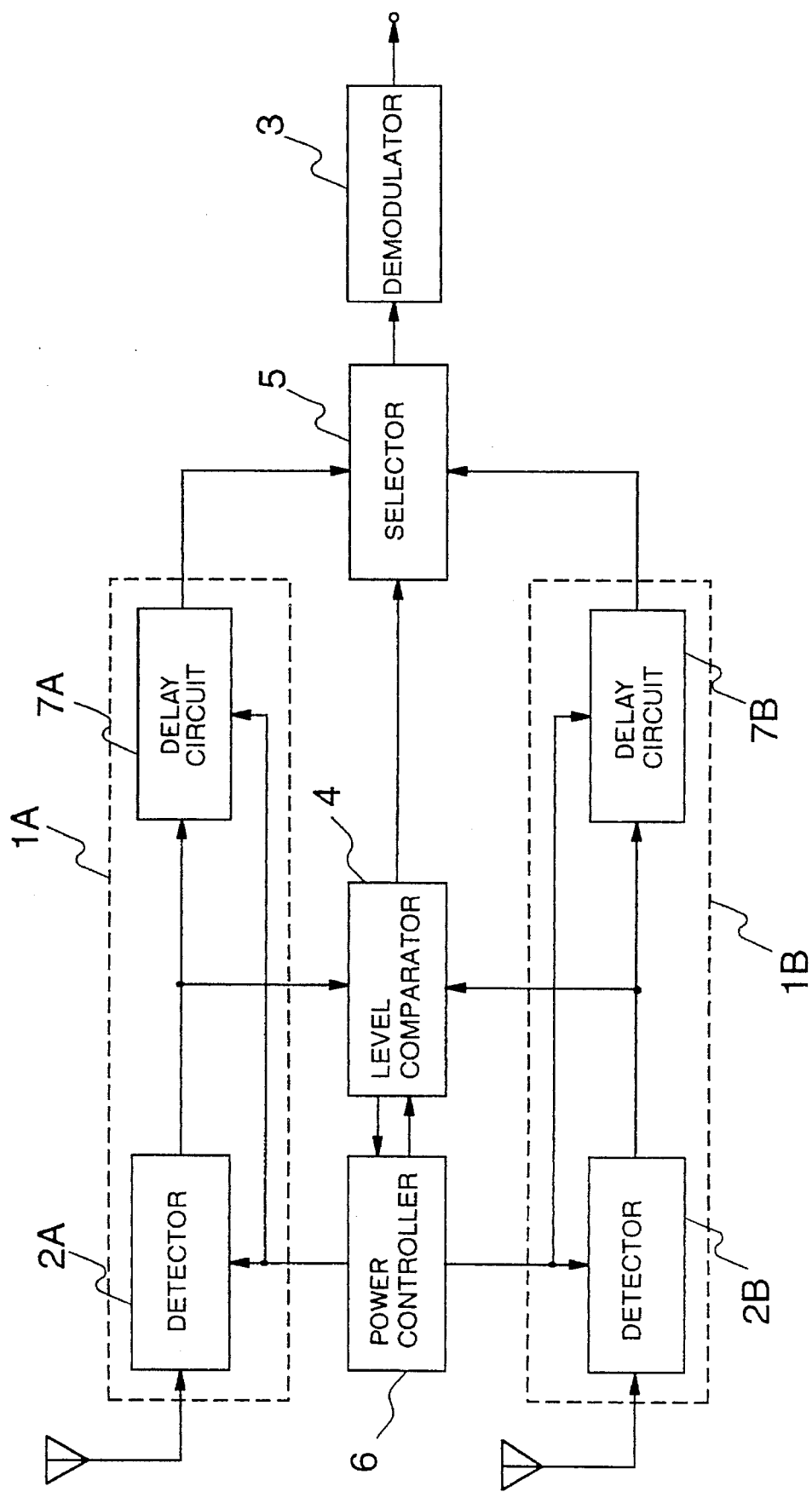
FIG. 5 is a functional block diagram showing the fourth embodiment of a diversity receiving apparatus according to the invention.

FIG. 5 is a functional block diagram showing the fourth embodiment of a diversity receiving apparatus according to the invention. In the fourth embodiment, the delay circuit 7A is provided between the detector 2A of the receiver 1A and the selector 5 in the first embodiment shown in FIG. 1, and the delay circuit 7B is provided between the detector 2B of the receiver 1B and the selector 5. A demodulator 3 is provided on the output side of the selector 5 in place of the demodulators 3A and 3B provided in the receivers 1A and 1B in the first embodiment. The setting of the timing for comparison of the received signal levels and the control of the power supply to the receivers 1A and 1B and the level comparator 4 are executed in a manner similar to the first embodiment. In the fourth embodiment, by setting proper delay times in the delay circuits 7A and 7B, the input to the selector 5 is delayed for a period of time during which the level comparison is finished in the level comparator and the selection is made by the selector 5 for the received signals which are sequentially inputted during the level comparison, thereby delaying the input to the demodulator 3. Thus, a diversity function can be realized with the single demodulator 3.

The fifth embodiment of a diversity receiving apparatus which is used in the digital communication system using the time division multiple access system will now be described.

The functional block diagrams in the first to fourth embodiments mentioned above can be also directly applied to a diversity receiving apparatus which is used in a digital communication system using the time division multiple access system. Since the output of the selector 5 in the functional block diagram in each of the first to third embodiments and the output of the demodulator 3 in the fourth embodiment will have been time compressed expanding process is executed by a signal processing circuit.

Figure 6:
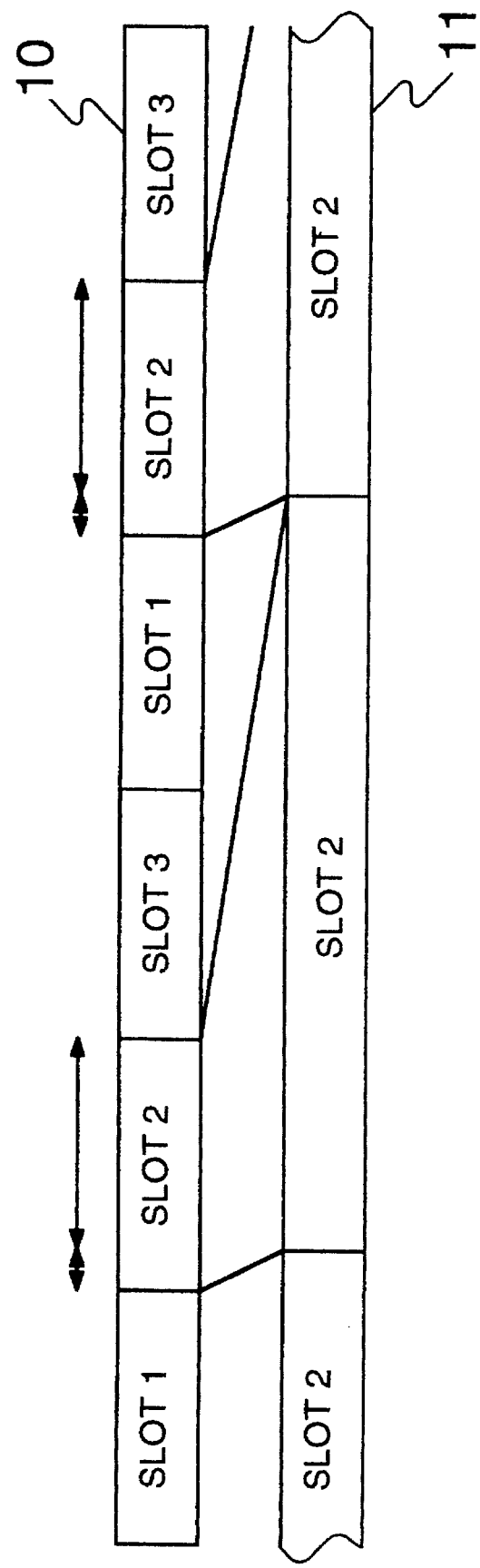
FIG. 6 is an explanatory diagram of the time division diversity reception according to the invention.

FIG. 6 is an operation timing chart of the diversity receiving apparatus which is used in the digital communication system using the time division multiple access system. In the digital communication system using the time division multiple access system, in the case where the slot 2 is allocated, the reception is performed only for a period of time of the slot 2 and the reception is stopped for the other periods of time. In the fifth embodiment, the power controller 6 supplies electric power to the level comparator 4 and both of the receivers 1A and 1B in the head portion of the slot 2. The detectors 2A and 2B select the desired signals of the slot 2 the received signals. The demodulators 3A and 3B reproduce the signals of the selected slot 2. The level comparator 4 compares the received signal levels of the signals in the head portions of the slots 2 which are outputted from the detectors 2A and 2B. The selector 5 selects only the signal from the receiver having the higher received signal level in accordance with the comparison result of the level comparator 4. The power controller 6 supplies an electric power to only the receiver having the higher received signal level which is to continue the reception in accordance with the comparison result of the level comparator 4 and stops the power supply to the other receiver and the power supply to the level comparator 4. Further, the power controller 6 also stops the power supply to the receiver which has been continuing the reception at the end of the time period of the slot 2. Namely, in almost all of the slot 2 at the operation timing in FIG. 6, only one of the receivers 1A and 1B made operative. When explaining the fifth embodiment with reference to FIG. 2, according to the fifth embodiment, the period of the timing of the level comparison shown by the arrows in FIG. 2 is made to coincide with a frame period in the time division multiple access system.

Figure 7:
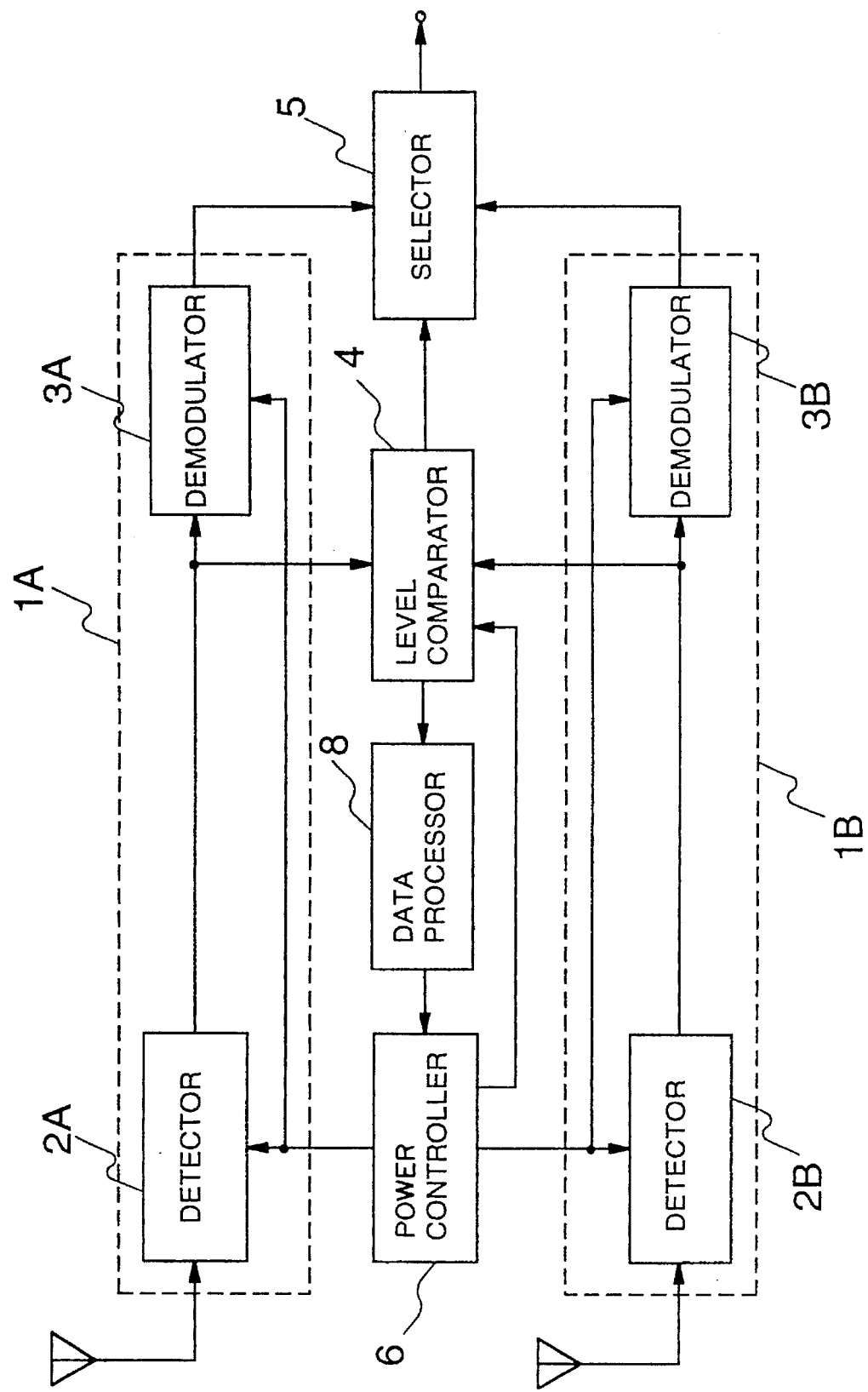
FIG. 7 is a functional block diagram showing the sixth embodiment of a diversity receiving apparatus according to the invention.

FIG. 7 is a functional block diagram showing the sixth embodiment of a diversity receiving apparatus according to the invention. In the sixth embodiment, the detection results of the past received signal levels of the receivers 1A and 1B and the comparison result of the received signal levels are stored in a data processor 8. The data processor 8 analyzes the change of the detection results or comparison result of the received signal levels over time. When it is discriminated by the data processor 8 that the received signal level suddenly changes with the elapse of time, the period of the level comparison is decreased. On the contrary, when it is discriminated that the fluctuation of the received signal level is gentle, the level comparison period is increased. An example will now be described. A plurality of level comparison periods are defined and a plurality of fluctuation thresholds respectively corresponding to the level comparison periods are defined for use in selecting an appropriate one of the level comparison period. A time fluctuation of the received signal level is obtained from a difference between the received signal level which was measured at the previous time and the received signal level measured at the current time. The period of the next level comparison (namely, the time between the last level comparison and the next level comparison) is selected from the level comparison periods based on a comparison between the obtained time fluctuation and the fluctuation thresholds. As another method, an equation representing a relation between the time fluctuation of the received signal level and the period of the level comparison can be also used.

Figure 8:
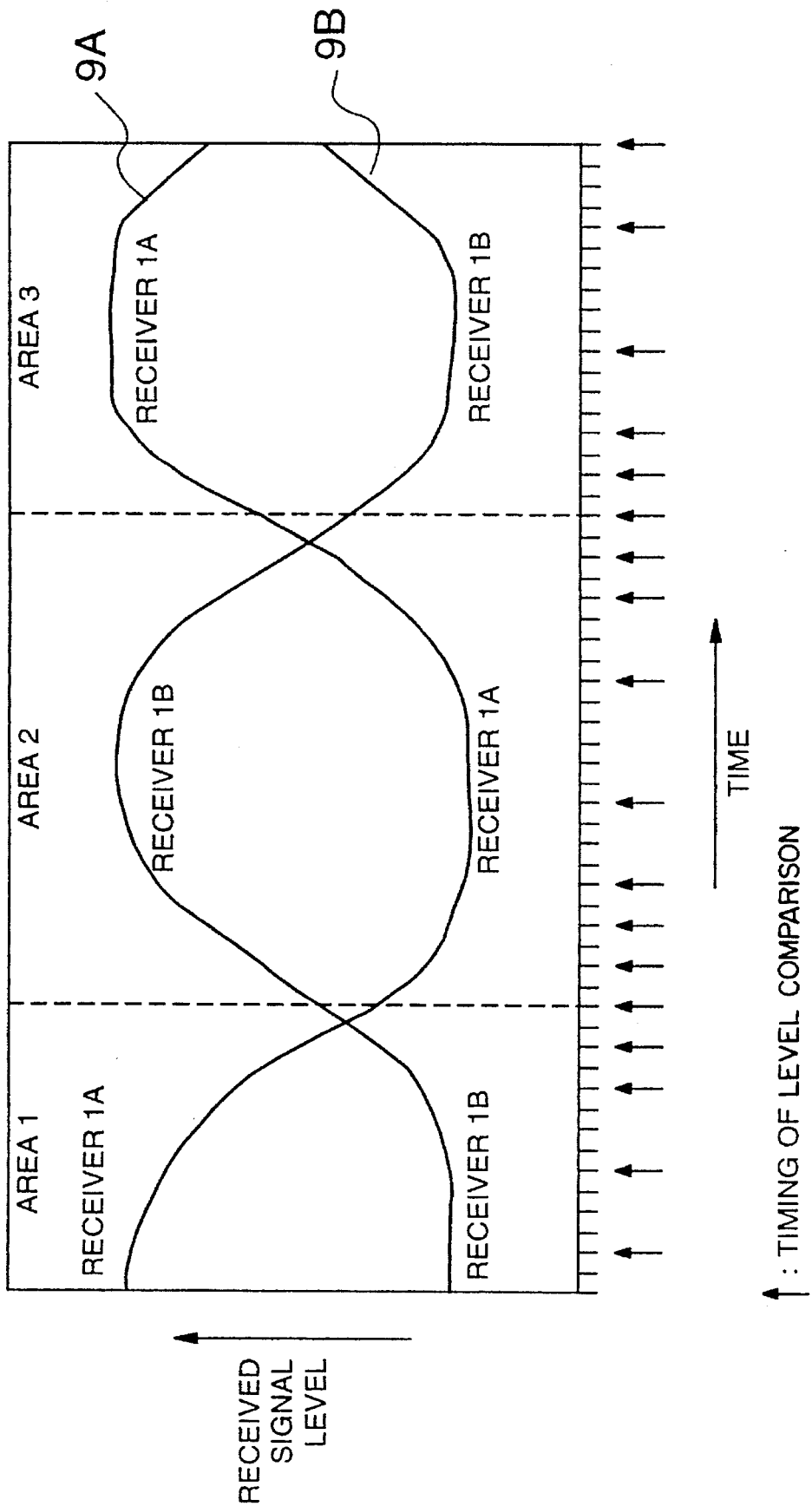
FIG. 8 is an explanatory diagram showing changes in received signal levels and the result of the diversity reception and selection according to the sixth embodiment of the invention.

FIG. 8 is an explanatory diagram showing changes in received signal levels and the selection result in the case where the level comparison period is switched between three level comparison periods in the sixth embodiment. When comparing the sixth embodiment shown in FIG. 8 and the first embodiment shown in FIG. 2, first, according to the sixth embodiment, the level comparison period in the boundary area between the areas can be reduced. In the sixth embodiment, consequently, the boundary between the areas 1 and 2 and between the areas 2 and 3 can be more accurately judged. This means that it is possible to trace the fluctuation of the received signal level, so that the diversity effect is eventually improved. Second, according to the sixth embodiment, it is possible to discriminate that the level fluctuation is gentle in the center portion of each area. According to the sixth embodiment, thus, the level comparison period can be increased. A frequency at which the receivers 1A and 1B are simultaneously made operative for comparison of the received signal levels decreases, so that the effect of the reduction of the electric power consumption is eventually improved.

Figure 9:
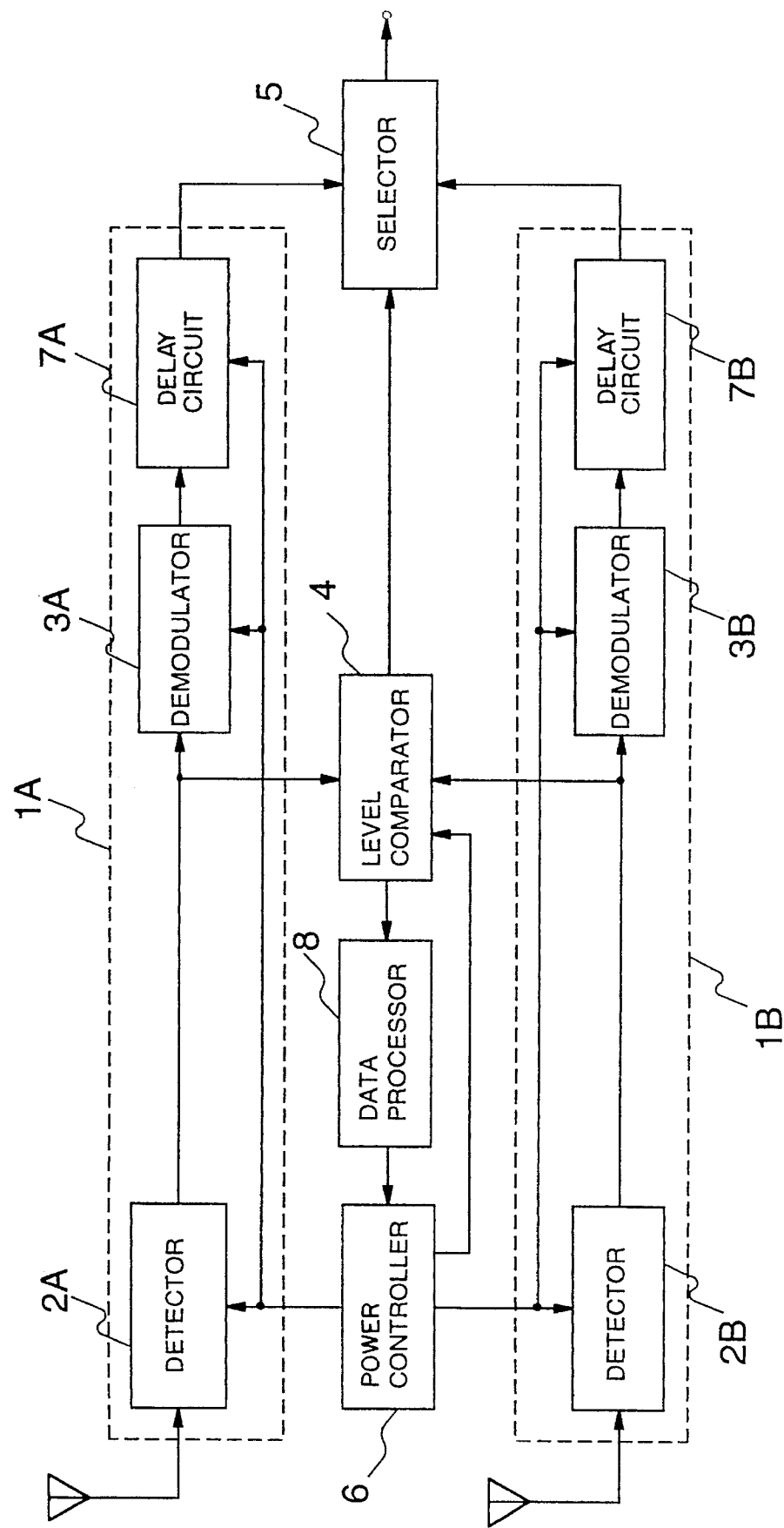
FIG. 9 is a functional block diagram showing the seventh embodiment of a diversity receiving apparatus according to the invention.
Figure 10:
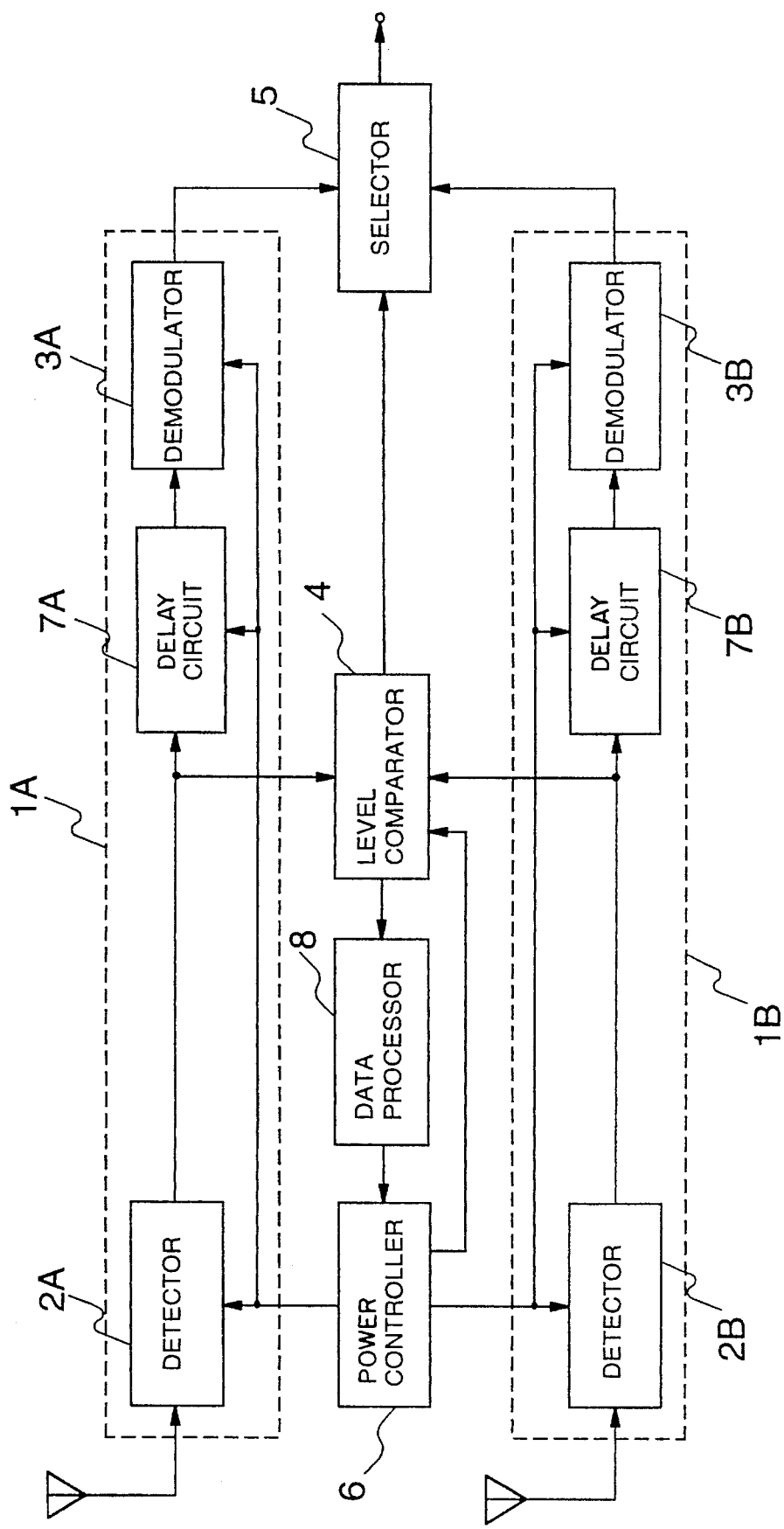
FIG. 10 is a functional block diagram showing the eighth embodiment of a diversity receiving apparatus according to the invention.

FIGS. 9 and 10 are functional block diagrams showing the seventh and eighth embodiments of a diversity receiving apparatus according to the invention. According to the seventh embodiment, the delay circuit 7A is provided between the demodulator 3A of the receiver 1A and the selector 5 in the sixth embodiment shown in FIG. 7, and the delay circuit 7B is provided between the demodulator 3B of the receiver 1B and the selector 5. According to the eighth embodiment, the delay circuit 7A is provided between the detector 2A of the receiver 1A and the demodulator 3A of the receiver 1A in the sixth embodiment shown in FIG. 7, and the delay circuit 7B is provided between the detector 2B of the receiver 1B and the demodulator 3B of the receiver IB. The setting of the timing of the comparison of the received signal levels, the selection of the demodulated signal by the selector 5, and the control of the power supply to the receivers 1A and 1B and the level comparator 4 are executed in a manner similar to the sixth embodiment. In the seventh and eighth embodiments, each of the delay circuits 7A and 7B has a delay time corresponding to the time which is required for the level comparison in the level comparator 4. By delaying the input of the demodulated signal to the selector 5 during the level comparison, the drop-out of the data during the level comparison can be prevented.

Figure 11:
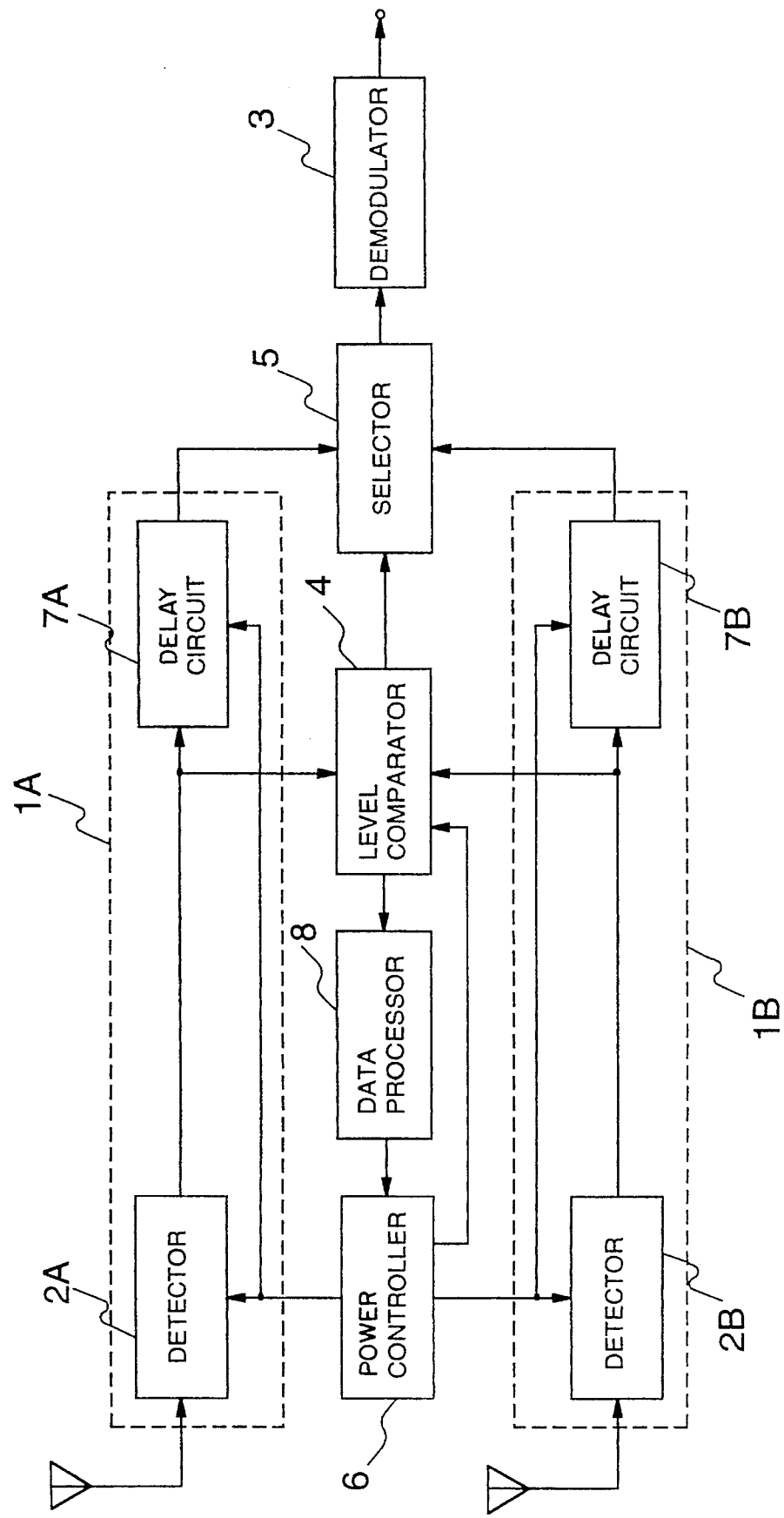
FIG. 11 is a functional block diagram showing the ninth embodiment of a diversity receiving apparatus according to the invention.

FIG. 11 is a functional block diagram showing the ninth embodiment of a diversity receiving apparatus according to the invention. In the ninth embodiment, the delay circuit 7A is provided between the detector 2A of the receiver 1A and the selector 5 in the sixth embodiment shown in FIG. 7, and the delay circuit 7B is provided between the detector 2B of the receiver 1B and the selector 5. The demodulator 3 is provided on the output side of the selector 5 in place of the demodulators 3A and 3B provided in the receivers 1A and 1B in the sixth embodiment. The setting of the timing for comparison of the received signal levels and the control of the power supply to the receivers 1A and 1B and the level comparator 4 are executed in a manner similar to the sixth embodiment. In the ninth embodiment, by setting proper delay times in the delay circuits 7A and 7B, the input to the selector 5 is delayed for a period of time during which the level comparison is finished in the level comparator 4 and the selection is made by the selector 5 for the received signals which are sequentially inputted during the level comparison, thereby delaying the input to the demodulator 3. Thus, a diversity function can be realized with the single demodulator 3.

The tenth embodiment of a diversity receiving apparatus which is used in a digital communication system using a time division multiple access system will now be described.

The functional block diagrams in the sixth to ninth embodiments mentioned above can be directly applied to the diversity receiving apparatus which is used in the digital communication system using the time division multiple access system. Since the output of the selector 5 in the functional block diagrams in the sixth to eighth embodiments and the output of the demodulator 3 in the ninth embodiment will have been time compressed in this case, a time expanding process is executed by a signal processing circuit.

According to the tenth embodiment, a plurality of level comparison periods corresponding to periods which are (n) times (n=1, 2, 3, ... ) as long as the frame period in the time division multiplex system, namely, the periods of the time division reception, are defined. A plurality of fluctuation thresholds respectively corresponding to the level comparison periods are defined for use in selecting an appropriate one of the level comparison periods and are stored in the data processor 8. The data processor 8 obtains a time fluctuation of the received signal level from the difference between the received signal level which was measured at the previous time and the received signal level measured at the current time, selects the period of the next level comparison (namely, the time between the last level comparison and the next level comparison) from the level comparison periods based on a comparison between the obtained time fluctuation and the fluctuation thresholds, and controls the power controller 6 in accordance with the selected level comparison period.

Figure 12:
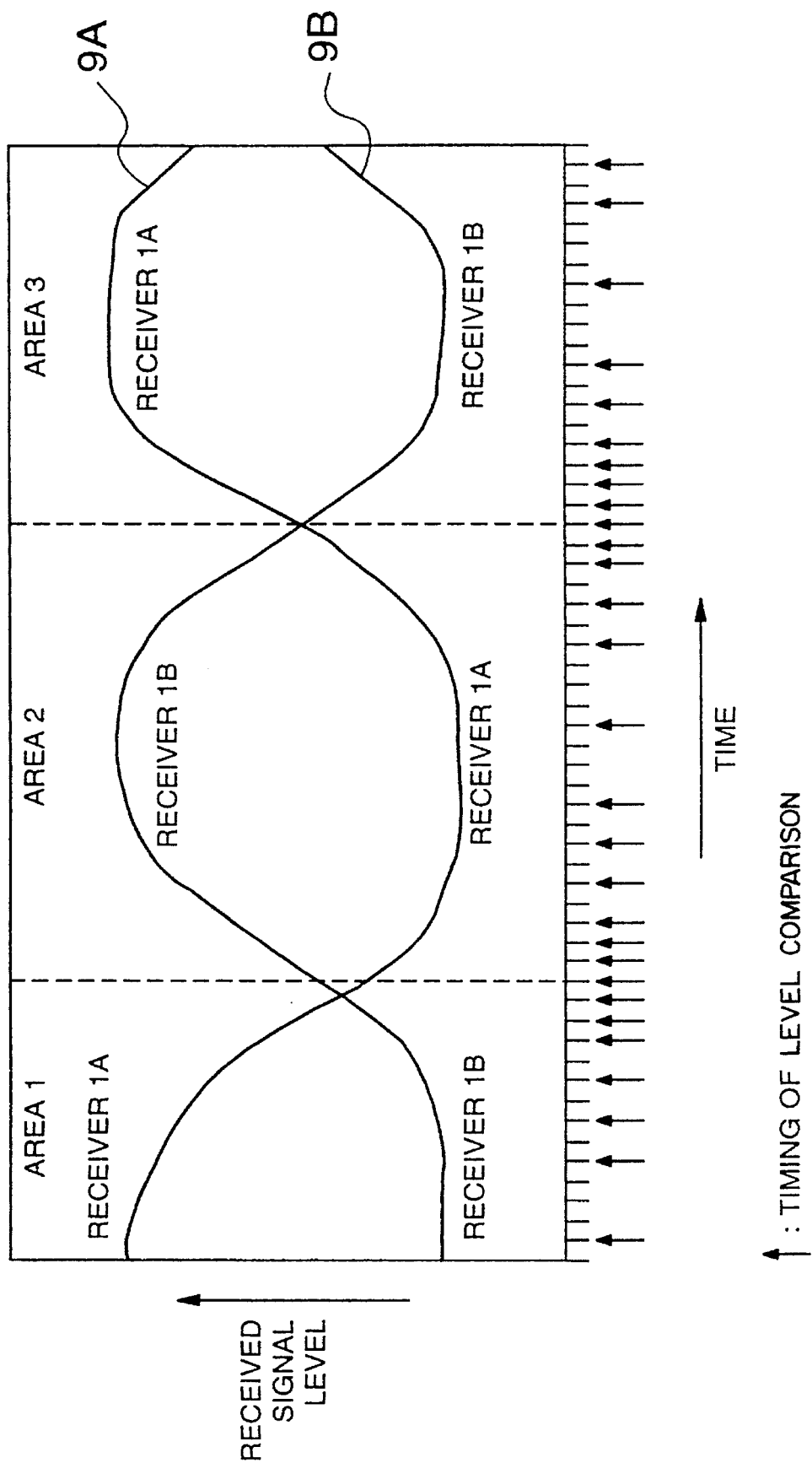
FIG. 12 is an explanatory diagram showing changes in received signal levels and the result of the diversity reception and selection according to the tenth embodiment.
Figure 13:
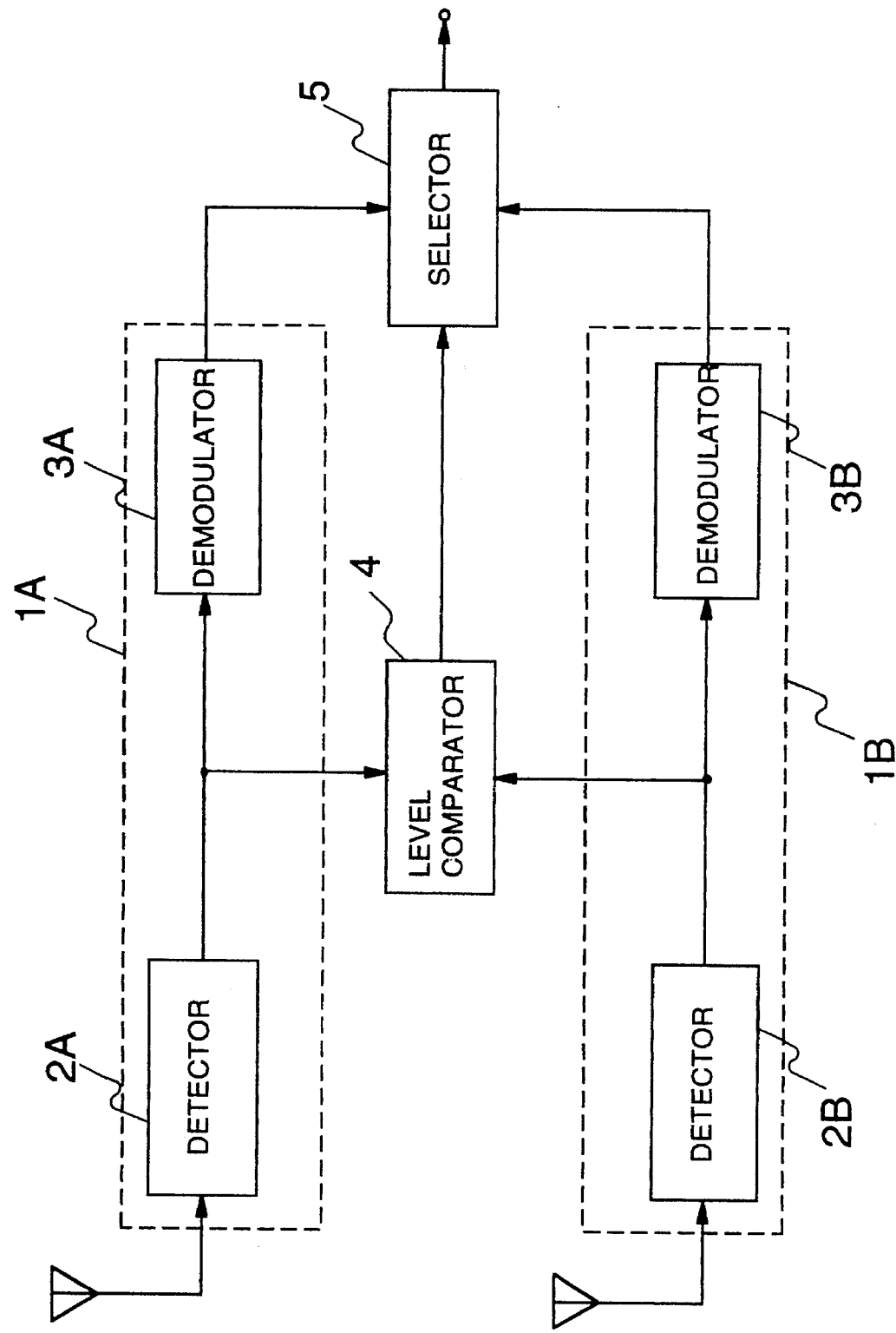
FIG. 13 is a functional block diagram showing an example of a conventional diversity receiving apparatus.
Figure 14:
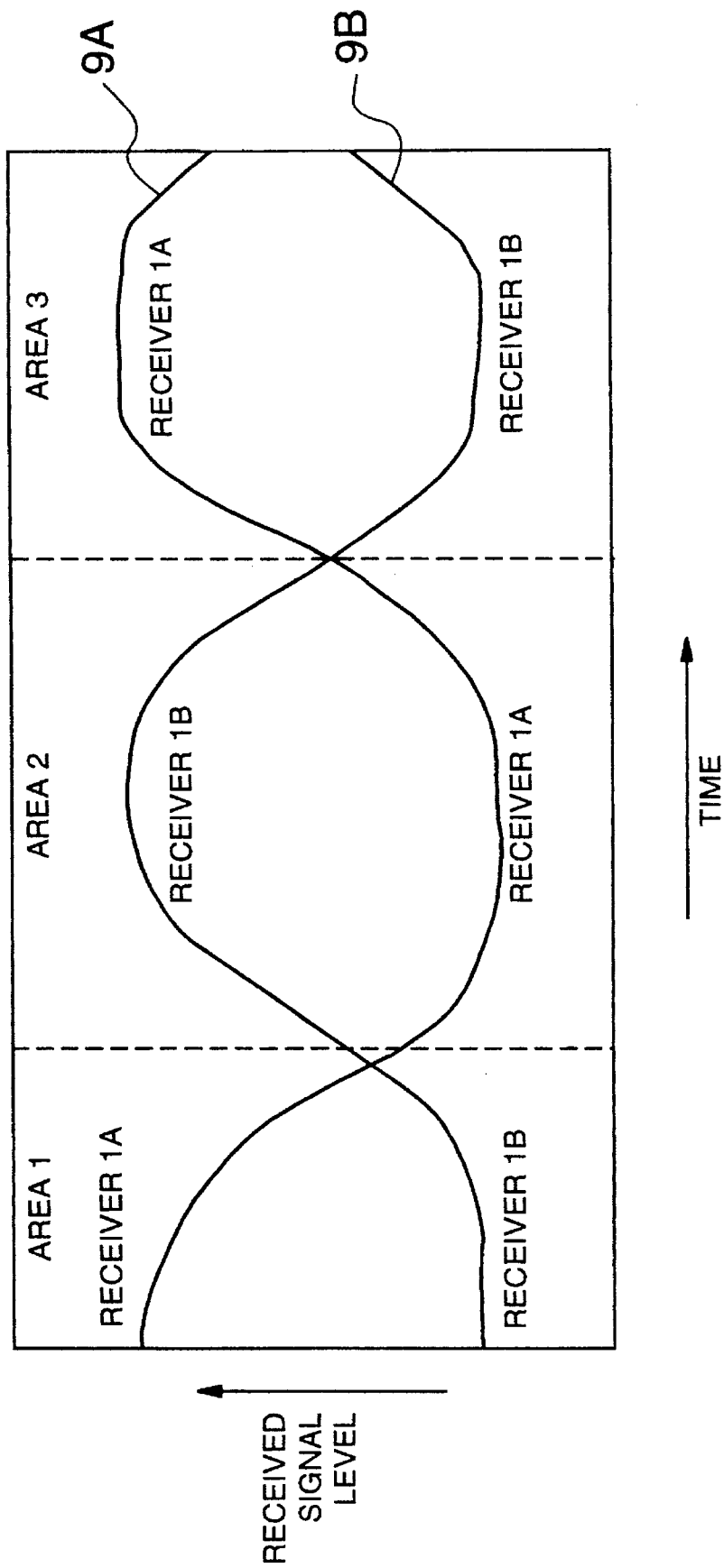
FIG. 14 is an explanatory diagram showing changes in received signal levels and the result of the conventional diversity reception and selection.
Figure 15:
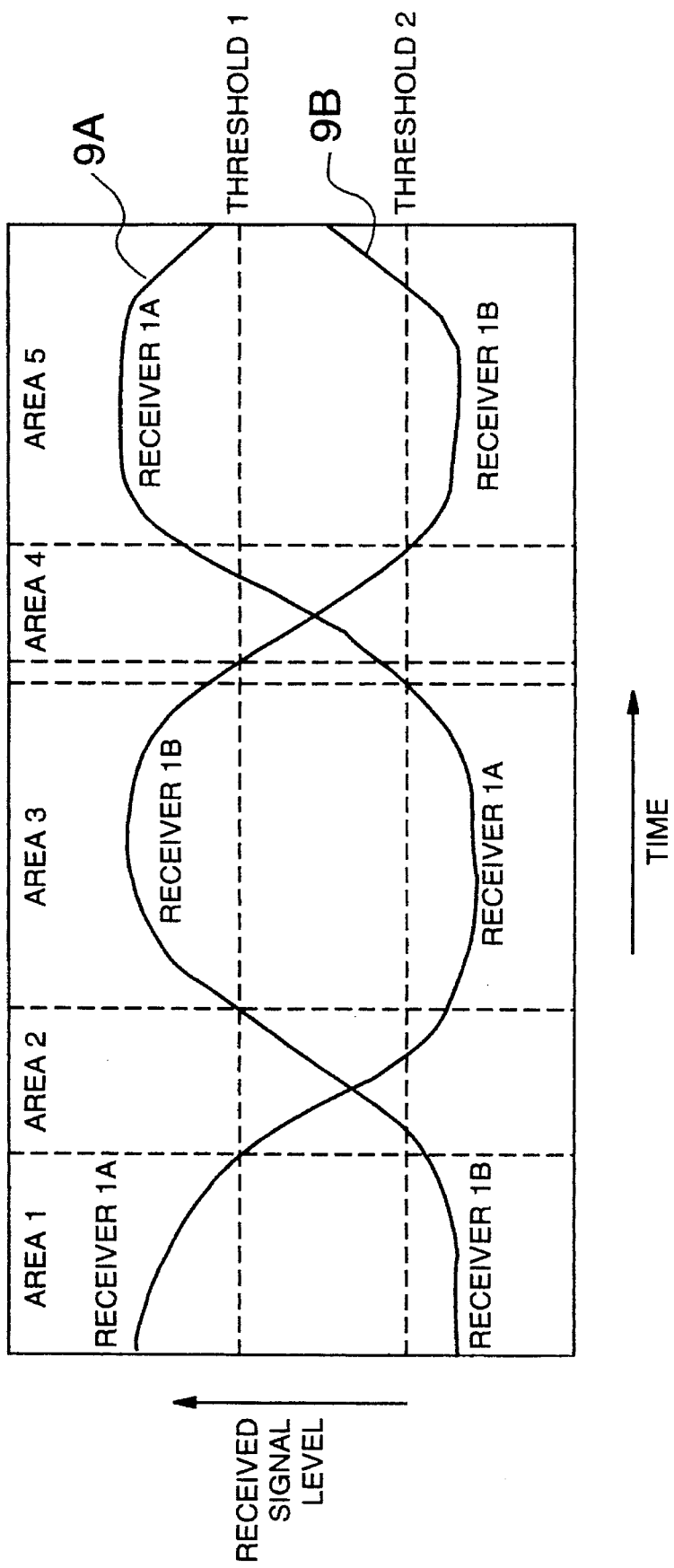
FIG. 15 is an explanatory diagram showing changes in received signal levels and the result of the conventional diversity reception and selection.
Figure 16:
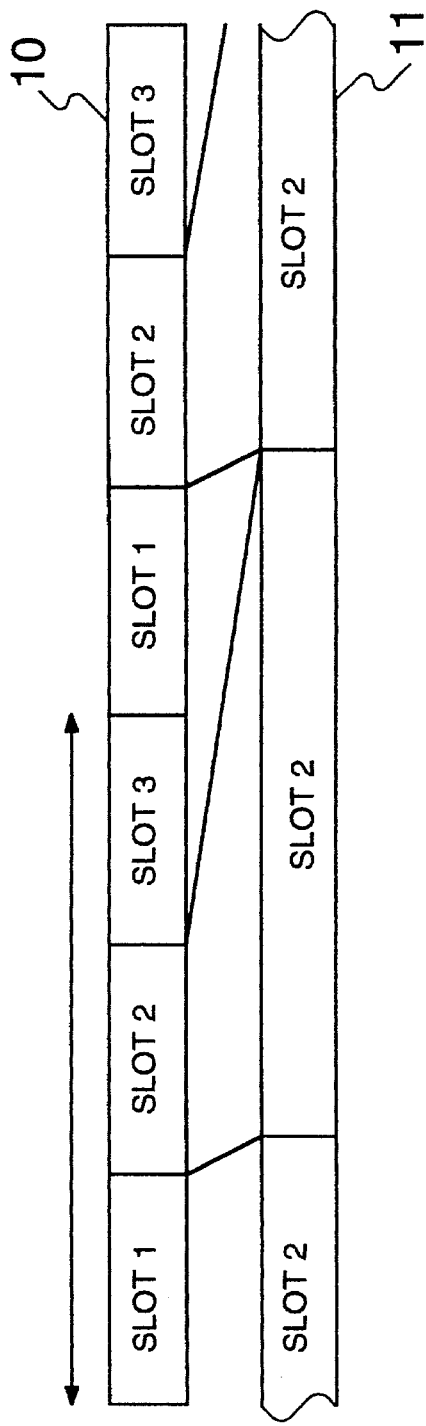
FIG. 16 is an explanatory diagram of a conventional time division diversity reception.
Figure 17:
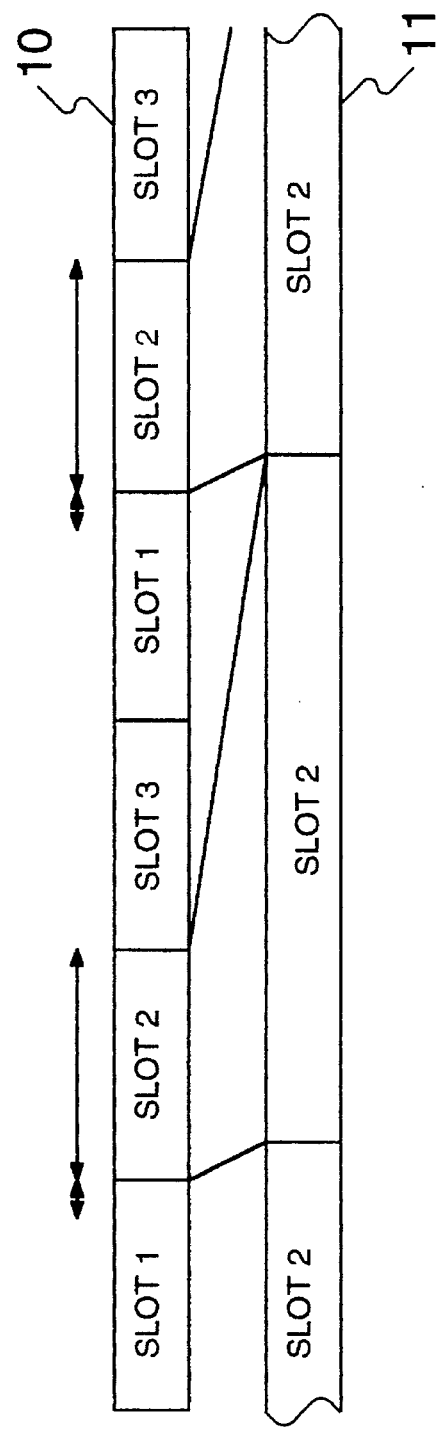
FIG. 17 is an explanatory diagram of another conventional time division diversity reception.

FIG. 12 is an explanatory diagram showing changes in received signal levels and the selection result in the case where the level comparison period is switched between three level comparison periods (n=1, 2, 4) in the tenth embodiment. In the diagram, a plurality of arrows shown in the lower portion show timings for the received signal level comparison. In the center portions of the areas 1, 2, and 3, the data processor 8 judges that the fluctuations of the received signal levels are gentle. The received signal level comparison period is increased from n=1 to n=2 or from n=2 to n=4. Thus, a frequency at which the receivers 1A and 1B are simultaneously made operative for the received signal level comparison decreases. The effect of the reduction of the electric power consumption is improved. When the difference between the received signal levels of the receivers 1A and 1B decreases with the elapse of time, or when the time fluctuation of the received signal level increases, comparison of the received signal levels in the next frame is executed, thereby equivalently reducing the received signal level comparison period (n=1).

According to the invention, in the diversity receiving apparatus comprising the plurality of receivers, the plurality of receivers are made operative only at the time of the received signal level comparison and only the selected receiver system is made operative after completion of the level comparison. Therefore, there is an effect that the electric power consumption is reduced with the diversity function being maintained.

By delaying the detected signal by using the delay circuit, the drop-out of the received signal during the level comparison can be prevented. There can be consequently, an effect such that the electric power consumption is reduced by providing the demodulator at the output of the selector. The differences among the delay times of the plurality of receivers due to the diversity switching can be adjusted by correcting the delay times of the delay circuits.

Further, by comparing the received signal levels in accordance with the time fluctuation of the received signal level and by selecting the level comparison period based on the comparison, in the case where the received signal level fluctuation is large, the diversity switching is frequently performed and the diversity effect can be assured. When the received signal level fluctuation is small, by reducing the frequency of the diversity switching, the total time during which simultaneous reception occurs is reduced. Thus, there is an effect that the reduction of the electric power consumption can be realized.

I claim:

1. A diversity receiving apparatus for selecting and extracting a received signal of a good receiving state from a plurality of received signals, comprising:

a plurality of receivers each of which is constructed by a detector for selecting a desired signal from said received signals and a demodulator for demodulating the selected signal;

a level comparator for comparing each received signal level of the signal selected by each of said detectors of said plurality of receivers;

a selector for selecting a demodulated signal from said demodulator of the receiver having the high received signal level on the basis of the comparison result in said level comparator and for outputting the selected demodulated signal; and a power controller for controlling a power supply to said plurality of receivers and said level comparator, wherein said power controller supplies electric powers to all of said receivers and said level comparator in accordance with a preset period of the comparison of the received signal levels and continues only the power supply to the receiver having the high received signal level on the basis of the comparison result in said level comparator and stops the power supply to the receivers other than said receiver having the high received signal level and to said level comparator.

2. An apparatus according to claim 1, wherein each of said receiver comprises a delay circuit which is provided at the post stage of said demodulator and delays the signal demodulated by said demodulator.

3. An apparatus according to claim 2, wherein said delay circuit has a delay time according to a time which is required for the comparison of the received signal levels in said level comparator.

4. An apparatus according to claim 1, wherein each of said receivers comprises a delay circuit which is provided between said detector and said demodulator and delays the signal selected by said detector.

5. An apparatus according to claim 4, wherein said delay circuit has a delay time according to a time which is required for the comparison of the received signal levels in said level comparator.

6. A diversity receiving apparatus which is used in a digital communication system using a time division multiple access system for selecting and extracting a received signal of a good receiving state from a plurality of received signals, comprising:

a plurality of receivers each of which is constructed by a detector for selecting the signal of a desired slot from the received signals of said time division multiple access system and a demodulator for demodulating the signal of the selected slot;

a level comparator for comparing each received signal level of the signal of the slot selected by each of said detectors of said plurality of receivers;

a selector for selecting a demodulated signal from the demodulator of the receiver having the high received signal level on the basis of the comparison result in said level comparator and for outputting the selected demodulated signal; and a power controller for controlling a power supply to said plurality of receivers and said level comparator, wherein said power controller executes the power supply to all of said receivers and said level comparator in a head portion of the slot at which the reception is desired in accordance with a frame period of said time division multiple access system, continues only the power supply to the receiver having the high received signal level on the basis of the comparison result in said level comparator, and stops the power supply to the receivers other than the receiver having the high received signal level and to said level comparator.

7. An apparatus according to claim 6, wherein each of said receivers further comprises a delay circuit which is provided at a post stage of said demodulator and delays the signal demodulated by said demodulator.

8. An apparatus according to claim 7, wherein said delay circuit has a delay time according to a time which is required for the comparison of the received signal levels in said level comparator.

9. An apparatus according to claim 6, wherein each of said receivers comprises a delay circuit which is provided between said detector and said demodulator and delays the signal of the slot selected by said detector.

10. An apparatus according to claim 9, wherein said delay circuit has a delay time according to a time which is required for the comparison of the received signal levels in said level comparator.

11. A diversity receiving apparatus for selecting and extracting a received signal of a good receiving state from a plurality of received signals, comprising:

a plurality of receivers each of which is constructed by a detector for selecting a desired signal from said received signals and a demodulator for demodulating the selected signal;

a level comparator for comparing each of the received signal levels of the signal selected by each of said detectors of said plurality of receivers;

a selector for selecting a demodulated signal from said demodulator of the receiver having the high received signal level on the basis of the comparison result in said level comparator and for outputting the selected demodulated signal;

a data processor for storing the detection result of the past received signal level, for analyzing an aging change of the detection result of the received signal level, and for deciding a period of the comparison of the received signal levels in accordance with an aging fluctuation amount of the received signal level; and a power controller for controlling a power supply to said plurality of receivers and said level comparator, wherein said power controller executes the power supply to all of said receivers and said level comparator in accordance with the period of the comparison of the received signal levels decided by said data processor, continues only the power supply to the receiver having the high received signal level on the basis of the comparison result in said level comparator, and stops the power supply to the receivers other than the receiver having the high received signal level and to said level comparator.

12. An apparatus according to claim 11, wherein each of said receivers comprises a delay circuit which is provided at the post stage of said demodulator and delays the signal demodulated by said demodulator.

13. An apparatus according to claim 12, wherein said delay circuit has a delay time according to a time which is required for the comparison of the received signal levels in said level comparator.

14. An apparatus according to claim 11, wherein each of said receivers comprises a delay circuit which is provided between said detector and said demodulator and delays the signal selected by said detector.

15. An apparatus according to claim 14, wherein said delay circuit has a delay time according to a time which is required for the comparison of the received signal levels in said level comparator.

16. A diversity receiving apparatus which is used in a digital communication system using a time division multiple access system for selecting and extracting a received signal of a good receiving state from a plurality of received signals, comprising:

- a plurality of receivers each of which is constructed by a detector for selecting the signal of a desired slot from the received signals of said time division multiple access system and a demodulator for demodulating the signal of the selected slot;
- a level comparator for comparing each of the received signal levels of the signal of the slot selected by each of said detectors of said plurality of receivers;
- a selector for selecting a demodulated signal from said demodulator of the receiver having the high received signal level on the basis of the comparison result in said level comparator and for outputting the selected demodulated signal;
- a data processor for storing the detection result of the past received signal level, for analyzing an aging change of the detection result of the received signal level, and for deciding a period of the comparison of the received signal levels corresponding to a period which is (n) times (n=1, 2, 3, . . . ) as long as a frame period of said time division multiple access system in accordance with an aging fluctuation amount of the received signal level; and
- a power controller for controlling a power supply to said plurality of receivers and said level comparator,
- wherein said power controller executes the power supply to all of said receivers and said level comparator in a head portion of the slot at which the reception is desired in accordance with the period of the comparison of the received signal levels decided by said data processor, continues only the power supply to the receiver having the high received signal level on the basis of the comparison result in said level comparator, and stops the power supply to the receivers other than the receiver having the high received signal level and to said level comparator.

17. An apparatus according to claim 16, wherein each of said receivers comprises a delay circuit which is provided at a post stage of said demodulator and delays the signal demodulated by said demodulator.

18. An apparatus according to claim 17, wherein said delay circuit has a delay time according to a time which is required for the comparison of the received signal levels in said level comparator.

19. An apparatus according to claim 16, wherein each of said receivers comprises a delay circuit which is provided between said detector and said demodulator and delays the signal selected by said detector.

20. An apparatus according to claim 19, wherein said delay circuit has a delay time according to a time which is required for the comparison of the received signal levels in said level comparator.

\* \* \* \* \*